US007497955B2

(12) United States Patent
Scheimann et al.

(10) Patent No.: US 7,497,955 B2
(45) Date of Patent: Mar. 3, 2009

(54) METHOD OF DEWATERING THIN STILLAGE PROCESSING STREAMS

(75) Inventors: David W. Scheimann, Joliet, IL (US); Angela S. Kowalski, Shenzhen (CN)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 11/611,599

(22) Filed: Dec. 15, 2006

(65) Prior Publication Data

US 2007/0210007 A1 Sep. 13, 2007

Related U.S. Application Data

(63) Continuation-in-part of application No. 10/888,327, filed on Jul. 9, 2004, now abandoned.

(51) Int. Cl.
*B01D 21/01* (2006.01)
(52) U.S. Cl. .................. 210/709; 210/714; 210/727; 210/734; 210/735; 426/11
(58) Field of Classification Search .................. 210/733
See application file for complete search history.

(56) References Cited

U.S. PATENT DOCUMENTS

| 4,226,714 A | 10/1980 | Furness et al. |
| 4,273,658 A | 6/1981 | Karman |
| 5,662,810 A | 9/1997 | Willgohs |
| 5,958,233 A | 9/1999 | Willgohs |
| 6,130,303 A | 10/2000 | Neff et al. |
| 6,132,625 A | 10/2000 | Moffett |
| 7,074,603 B2 * | 7/2006 | Verser et al. ............ 435/135 |
| 7,101,691 B2 * | 9/2006 | Kinley et al. ............ 435/161 |
| 7,455,997 B2 * | 11/2008 | Hughes ................... 435/109 |

| 2005/0079270 A1 * | 4/2005 | Scheimann ............... 426/623 |
| 2007/0036881 A1 * | 2/2007 | Griffith .................... 426/11 |

FOREIGN PATENT DOCUMENTS

| CN | 1179270 | 4/1998 |
| JP | 08229598 | 9/1996 |

OTHER PUBLICATIONS

Levic, L., Delic, I., Levic, J., English Abstract, "Separation of macromolecular compounds from brewer's spent grain wastewater", Fac. Chem. Technol., Univ. Novi Sad, Yugoslavia, Hemijska Industrija (1993), 47 (1-3), 8-10.
Minowa, T., Yokoyama, S., Koguchi, K., Ogi, T., Takahashi, T., English Abstract, "The characteristics of dewatering ethanol fermentation stillage" (Part 1), Fuel Dep., Kogai Shigen Kenkyusho, Ibaraki, Japan, Kogai Shigen Kenkyusho Iho (1989), 18(2), 1-12.
Minowa, T., Yokoyama, S., Ogi, T., Dote, Y., English Abstract, "The characteristics of dewatering of ethanol fermentation stillage" (Part 2), Fuel Dep., Kogai Shigen Kenkyusho, Tsukuba, Japan, Kogai Shigen Kenkyusho Iho (1990), 19(1), 13-24.
Silva, D.A., Majela, G., English Abstract, "Treatment and agroindustrial use of distillery wastes", TAA/PLANACSUCAR-Programa Nacional de Melhoramento da Cana de Acucar, Brazil, Braz. Pedido PI, 4 pp.

* cited by examiner

*Primary Examiner*—Peter A Hruskoci
(74) *Attorney, Agent, or Firm*—William J. Maheras; Michael B. Martin

(57) ABSTRACT

A method dewatering thin stillage process streams generated in the processing of grain to ethanol comprising adding to the process streams an effective flocculating amount of an anionic copolymer comprising acrylic acid sodium salt, methacrylic acid sodium salt or 2-acrylamido-2-methyl-1-propanesulfonic acid sodium salt to form a mixture of water and flocculated solids; and separating the water from the flocculated solids using a dewatering device.

24 Claims, No Drawings

METHOD OF DEWATERING THIN STILLAGE PROCESSING STREAMS

CROSS REFERENCE TO RELATED APPLICATIONS

This is a continuation-in-part of Ser. No. 10/888,327 filed Jul. 9, 2004, now abandoned.

TECHNICAL FIELD

This invention relates to a method and apparatus for dewatering dry grind ethanol process streams generated in the processing of germ containing grain, like corn, to ethanol. More particularly, this invention concerns using anionic flocculants alone or in combination with microparticulate settling aids to enhance solid-liquid separation and increase the overall efficiency of the ethanol manufacturing process.

BACKGROUND OF THE INVENTION

In the dry milling process used for manufacturing both food and fuel grades of ethanol from corn, a "beer mash" is made from which the ethanol is removed in a stripper column. The remaining mash is referred to as whole stillage or thick stillage in the fuel ethanol industries and thick slop in the beverage industry. The stillage which is typically in the range of 11% to 15% solids contains all of the other non-starch components of the corn kernel that pass through the process (germ, protein, gluten, hull & fiber etc.). Horizontal dewatering centrifuges are then typically used for removing a portion of the suspended solids from the whole stillage stream.

The centrifuges split the process stream into two fractions the first being a liquid stream called thin stillage and the second being the cake solids or distillers grains. The resulting solids or distillers grains, which typically contain about 65 to 85 percent water, are sent to a drying operation where the remaining water is removed by evaporation and the solids are dried to less than about 10 percent moisture. The dried solids, referred to as dry distiller grains (DDG's) are used as a nutrient source in the manufacture of certain animal feeds. In certain applications the material from the centrifuges may be hauled off site and disposed of by land application techniques or discarded in a landfill.

The liquid stream from the dewatering device is called centrate (thin stillage), which typically contains 6-10 percent solids by weight, with about 2 to 4% being suspended solids and about 4 to 6% being present as dissolved solids. The centrate or thin stillage from the centrifuge contains a number of valuable co-products some of which are soluble and some of which are suspended.

The thin stillage stream can be processed or used in a number of different operations within the plant. The decision as to how the stillage stream will be split and processed in a particular plant is based upon the economics of each available option. Typically a fraction of the centrate or thin stillage is sent back to the head of the plant as make-up water for the fermentation process, this stream is typically referred to as backset and may be as much as 50% of the thin stillage stream. The balance of the thin stillage stream is sent to an evaporation process where the water is removed and the dissolved and suspended solids are concentrated to a syrup with a solids content of 20 to 50 percent solids by weight. This material may then be blended with the distillers grains from the centrifuges or the dry distiller grains from the feed dryers to produce an animal feed at >88% solids commonly referred to as dry distillers grains with solubles (DDGS). The material can also bypass the drying operation and be supplied as a material referred to as wet feed at 30 to 40% solids.

The current standard in the dry grind ethanol industry is the use of high speed horizontal decanter type centrifuges for removing the suspended solids from the whole stillage or thick slop. The centrifuges are only effective in capturing a portion of the suspended solids in the whole stillage stream. Due to the high shear imparted in the unit a considerable portion of the smaller particles (fines) or the larger particles which are sheared can pass through the unit and are discharged in the centrate (thin stillage). A fraction of solids present in the thin stillage have a density very close to that of water and are extremely sensitive to shear making their removal in a centrifuge extremely difficult. We have observed that the fine suspended solids in the thin stillage (centrate) do not settle even when allowed to stand undisturbed for extended periods of time (24 to 48 hours or in some cases more). Another component of the whole stillage stream that is of some concern is the oil, which is carried through the process. The oil fraction is present in the whole stillage as the germ of the corn kernel is not removed or recovered in corn dry milling operations. The centrifuges used for processing stillage have been optimized for solids capture efficiency and as a result they only remove a portion of the oil present in the whole stillage stream.

The use of the processing aids described in this invention and the mechanical component as described in this invention have resulted in significant improvements in suspended solids capture efficiencies and the capture and removal of oils from the thin stillage, the backset and the syrup streams.

Various processing aids (flocculants, coagulants, agglomeration aids) have been evaluated in centrifuges in order to improve the discharged cake solids and reduce the solids in the centrate. Due to the physical characteristics of the centrifuges the improvements in cake solids or centrate quality as a result of the addition of anionic flocculants to the centrifuges was negligible.

Therefore, there is an ongoing need for improved solids/liquids separation technologies, dewatering and processing aids and the development of methods which improve the efficiency of solid-liquid separation in the whole stillage, thin stillage, backset and syrup streams, with concomitant reduction in the energy required to prepare the dry distiller grains and produce ethanol.

SUMMARY OF THE INVENTION

We have discovered that the use of certain anionic polymers flocculants can significantly improve the agglomeration of the solids in the centrate (thin stillage) from the centrifuges. The improvement is observed in both the rate at which the solids agglomerate and settle and also in their ability to withstand mechanical shear as they are decanted. When the anionic polymer and any process aids are used in combination with a low shear mechanical solids liquids separation device optimized for this application the resulting effluent contains little to no suspended solids. The oil content of the effluent is also significantly reduced. The solids generated are also more concentrated and as a result the energy required for further processing is significantly reduced.

Accordingly, this invention is a method of removing suspended solids, fats, oils and 25 grease from thin a stillage of a dry grind ethanol process stream comprising (i) adding to the thin stillage process stream an effective flocculating amount of one or more anionic polymers, the anionic polymers comprising one or more anionic monomers selected from acrylic acid sodium salt, 2-acrylamido- 2-methyl-1-propanesulfonic acid sodium salt and methacrylic acid sodium salt and optionally one or more acrylamide monomers to form a mixture of water and coagulated and flocculated solids; and (ii) separating the water from the flocculated solids using a solids/liquids separation device.

The dewatering process of this invention significantly improves the agglomeration of the solids, the fines capture and the settling rate of the solids such that they can be settled and removed in a low shear mechanical dewatering device. As a result of the improvements in agglomeration and settling the supernate containing very few solids can be sent back to the head of the process. The solids from the bottom of the settling apparatus can be concentrated and then sent to syrup evaporation or possibly to the feed dryer. The anionic polymer or cationic coagulant/anionic polymer combinations of this invention is most preferred in low shear dewatering apparatus, but has shown activity in high shear applications. The improvement in particle agglomeration and solids capture also significantly reduces the time required to process the stillage and thereby improves the plant throughput.

DETAILED DESCRIPTION OF THE INVENTION

The method of this invention is suitable for enhancing solid-liquid separation in thin stillage process streams generated in processes for preparing ethanol from the fermentation of grains including corn and other germ containing grain and the like. The method is particularly suitable for thin stillage process streams generated in processing of corn to ethanol.

As used herein "thin stillage process stream" means any process stream(s) generated in the ethanol plant subsequent to dewatering of the whole stillage, including the thin stillage, the backset and the syrup streams.

The anionic polymers suitable for use in the method of this invention are prepared by polymerizing acrylic acid sodium salt, methacrylic acid sodium salt or 2-acrylamido-2-methyl-1-propanesulfonic acid sodium salt or a combination thereof and optionally one or more acrylamide monomers under free radical forming conditions using methods known in the art of polymer synthesis. Many anionic polymers are commercially available, for example from Nalco Company, Naperville, Ill.

"Acrylamide monomer" means an electrically neutral monomer derived from acrylamide. Representative acrylamide monomers include acrylamide, methacrylamide, N-methylacrylamide, N,N-dimethyl(meth)acrylamide, N-isopropyl(meth)acrylamide, N-(2-hydroxypropyl)methacrylamide, N-methylolacrylamide, and the like. Preferred acrylamide monomers include acrylamide and methacrylamide. Acrylamide is more preferred.

The anionic polymer may be cross-linked with about 0.005 to about 10 ppm of one or more cross linking agents. "Cross-linking agent" means a multifunctional monomer that when added to polymerizing monomer or monomers results in "cross-linked" polymers in which a branch or branches from one polymer molecule become attached to other polymer molecules. Representative cross-linking agents include N,N-methylenebisacrylamide, N,N-methylenebismethacrylamide, triallylamine, triallyl ammonium salts, ethylene glycol dimethacrylate, diethylene glycol dimethacrylate, polyethylene glycol diacrylate, triethylene glycol dimethylacrylate, polyethylene glycol dimethacrylate, N-vinylacrylamide, N-methylallylacrylamide, glycidyl acrylate, acrolein, glyoxal, vinyltrialkoxysilanes and the like. Preferred cross-linking agents are selected from N,N-methylenebisacrylamide, polydiethyleneglycoldimethacrylate, trimethylolpropane ethoxylate (x EO/y OH) tri(meth)acrylate, where x=1-20 and y=1-5, trimethylolpropane propoxylate (x EO/y OH) triacrylate, where x=1-3 and y=1-3, and 2-hydroxyethylmethacrylate.

Preferred anionic polymers for use in the method of this invention include dry polymers, emulsion polymers and dispersion polymers. Dry polymers and emulsion polymers are more preferred.

"Emulsion polymer" and "latex polymer" mean an invertible water-in-oil polymer emulsion comprising an anionic polymer according to this invention in the aqueous phase, a hydrocarbon oil for the oil phase, a water-in-oil emulsifying agent and, potentially, an inverting surfactant. Inverse emulsion polymers are hydrocarbon continuous with the water-soluble polymers dispersed as micron sized particles within the hydrocarbon matrix. The advantages of polymerizing water-soluble monomers as inverse emulsions include 1) low fluid viscosity can be maintained throughout the polymerization, permitting effective mixing and heat removal, 2) the products can be pumped, stored, and used easily since the products remain liquids, and 3) the polymer "actives" or "solids" level can be increased dramatically over simple solution polymers, which, for the high molecular weight flocculants, are limited to lower actives because of viscosity considerations. The inverse emulsion polymers are then "inverted" or activated for use by releasing the polymer from the particles using shear, dilution, and, generally, another surfactant, which may or may not be a component of the inverse emulsion.

Inverse emulsion polymers are prepared by dissolving the desired monomers in the aqueous phase, dissolving the emulsifying agent(s) in the oil phase, emulsifying the water phase in the oil phase to prepare a water-in-oil emulsion, in some cases, homogenizing the water-in-oil emulsion, polymerizing the monomers dissolved in the water phase of the water-in-oil emulsion to obtain the polymer as a water-in-oil emulsion. If so desired, a self-inverting surfactant can be added after the polymerization is complete in order to obtain the water-in-oil self-inverting emulsion.

The oil phase comprises any inert hydrophobic liquid. Preferred hydrophobic liquids include aliphatic and aromatic hydrocarbon liquids including benzene, xylene, toluene, paraffin oil, mineral spirits, kerosene, naphtha, and the like. A paraffinic oil is preferred.

Free radical yielding initiators such as benzoyl peroxide, lauroyl peroxide, 2,2'-azobis (isobutyronitrile) (AIBN), 2,2'-azobis(2,4-dimethylvaleronitrile) (AIVN), potassium persulfate and the like are useful in polymerizing vinyl and acrylic monomers. 2,2'-azobis(isobutyronitrile) (AIBN) and 2,2'-azobis(2,4-dimethylvaleronitrile) (AIVN) are preferred. The initiator is utilized in amounts ranging between about 0.002 and about 0.2 percent by weight of the monomers, depending upon the solubility of the initiator.

Water-in-oil emulsifying agents useful for preparing the emulsion polymers of this invention include sorbitan esters of fatty acids, ethoxylated sorbitan esters of fatty acids, and the like or mixtures thereof. Preferred emulsifying agents include sorbitan monooleate, polyoxyethylene sorbitan monostearate, and the like. Additional details on these agents may be found in McCutcheon's *Detergents and Emulsifiers*, North American Edition, 1980. Any inverting surfactant or inverting surfactant mixture described in the prior art may be used.

Representative inverting surfactants include ethoxylated nonylphenol, ethoxylated linear alcohols, and the like. Preferred inverting surfactants are ethoxylated linear alcohols.

The polymer is prepared by polymerizing the appropriate monomers at from about 30° C. to about 85° C. over about 1 to about 24 hours, preferably at a temperature of from about 40° C. to about 70° C. over about 3 to about 6 hours.

"Dispersion" polymers mean a water-soluble polymer dispersed in an aqueous continuous phase containing one or more inorganic salts. Representative examples of dispersion polymerization of water-soluble anionic and nonionic monomers in an aqueous continuous phase can be found in U.S. Pat. Nos. 5,605,970, 5,837,776, 5,985,992 and 6,265,477.

Dispersion polymers are prepared by combining water, one or more inorganic salts, one or more water-soluble monomers, any polymerization additives such as chelants, pH buffers or chain transfer agents, and a water-soluble stabilizer polymer. This mixture is charged to a reactor equipped with a mixer, a thermocouple, a nitrogen purging tube, and a water condenser. The monomer solution is mixed vigorously, heated to the desired temperature, and then a water-soluble initiator is added. The solution is purged with nitrogen while maintaining temperature and mixing for several hours. During the course of the reaction, a discontinuous phase containing the water-soluble polymer is formed. After this time, the products are cooled to room temperature, and any post-polymerization additives are charged to the reactor. Water-continuous dispersions of water-soluble polymers are free flowing liquids with product viscosities generally 100-10,000 cP, as measured at low shear. The advantages of preparing water-soluble polymers as water continuous dispersions are similar to those already mentioned in association with the inverse emulsion polymers. The water continuous dispersion polymers have the further advantages that they contain no hydrocarbon oil or surfactants, and require no surfactant for "inversion" or activation.

"Dry polymer" means a polymer prepared by gel polymerization. "Gel" polymerization is defined as a process for producing polymers as dry powders. The preparation of high molecular weight water-soluble polymers as dry powders using a gel polymerization is generally performed as follows: an aqueous solution of water-soluble monomers, generally 20-60 percent concentration by weight, along with any polymerization or process additives such as chain transfer agents, chelants, pH buffers, or surfactants, is placed in an insulated reaction vessel equipped with a nitrogen purging tube. A polymerization initiator is added, the solution is purged with nitrogen, and the temperature of the reaction is allowed to rise uncontrolled. When the polymerized mass is cooled, the resultant gel is removed from the reactor, shredded, dried, and ground to the desired particle size.

Anionic polymers suitable for use in the method of this invention preferably have an anionic charge of about 10 to about 100 mole percent, more preferably about 30 to about 70 mole percent and most preferable with an anionic charge of about 35 to about 45 mole percent.

In a preferred aspect of this invention, the anionic polymer is selected from the group consisting of acrylamide-acrylic acid sodium salt copolymer and acrylamide-2-acrylamido-2-methyl-1-propanesulfonic acid sodium salt copolymer.

In another preferred aspect, acrylamide-acrylic acid sodium salt copolymer and acrylamide-2-acrylamido-2-methyl-1-propanesulfonic acid sodium salt copolymer have an 25 anionic charge of about 10 to about 90 mole percent.

In another preferred aspect, acrylamide-acrylic acid sodium salt copolymer and acrylamide-2-acrylamido-2-methyl-1-propanesulfonic acid sodium salt copolymer have an anionic charge of about 30 to about 70 mole percent.

In another preferred embodiment, the anionic polymer is acrylamide-sodium acrylate-sodium methacrylate terpolymer.

In another preferred embodiment, the acrylamide-sodium acrylate-sodium methacrylate terpolymer has an anionic charge of about 1 to about 50 mole percent.

The anionic polymers preferably have a reduced specific viscosity of about 10 to about 60 dl/g, more preferably about 15 to about 40 dl/g.

"Reduced specific viscosity" (RSV) is an indication of polymer chain length and average molecular weight. The RSV is measured at a given polymer concentration and temperature and calculated as follows:

$$RSV = \frac{\left[\left(\frac{\eta}{\eta_o}\right) - 1\right]}{c}$$

wherein $\eta$=viscosity of polymer solution;

$\eta_o$=viscosity of solvent at the same temperature; and c=concentration of polymer in solution.

As used herein, the units of concentration "c" are (grams/100 ml or g/deciliter). Therefore, the units of RSV are dl/g. The RSV is measured at 30° C. The viscosities $\eta$ and $\eta_o$ are measured using a Cannon-Ubbelohde semimicro dilution viscometer, size 75. The viscometer is mounted in a perfectly vertical position in a constant temperature bath adjusted to 30±0.02° C. The error inherent in the calculation of RSV is about 2 dl/g. Similar RSVs measured for two linear polymers of identical or very similar composition is one indication that the polymers have similar molecular weights, provided that the polymer samples are treated identically and that the RSVs are measured under identical conditions.

The effective dosage, addition point(s) and mode of addition of anionic polymer to the thin stillage process stream can be empirically determined to obtain the proper polymer/particle interaction and optimize the chemical treatment program performance. For higher RSV product samples more mixing is typically required. For lower RSV polymers less mixing is required.

The anionic polymer dosage required for optimum dewatering is based upon a number of factors including inverted polymer concentration, thin stillage process stream solids, available polymer/particle mixing energy and the type of dewatering device used. A preferred polymer dosage is about 50 to about 500 ppm of anionic polymer is added to the thin stillage process stream.

Emulsion polymers are typically inverted as a 0.1 to 5.0 percent by weight solution in clean water according to standard practices for inverting latex flocculants as described herein. The polymer is applied to the thin stillage or thin slop process stream. Dry anionic polymer flocculants are used in a similar fashion with the product being made up at concentrations of 0.1 to 1.5 percent polymer product according to the standard practices and recommended polymer aging times for preparing dry flocculants.

In addition the invention may also include a water-soluble cationic coagulant added to the dry grind ethanol process.

In another preferred aspect of this invention, one or more microparticulate settling aids are added to the thin stillage process stream.

"Microparticulate settling aids" refers to certain insoluble materials which are added to the process stream which physically interact with the suspended solids, fats, oils and greases in the process stream and facilitate the separation and removal of these components by physical interaction. Without being limited by theory, we believe that addition of these materials provides a surface area and sites where polymers can interact and bridge the suspended particles forming an agglomerated particle or a floc. The use of a microparticle results in a floc or agglomerated particle that is more resistant to mechanical shear and as a result uses a physical sweep floc mechanism to capture and remove suspended solids, fats, oils and greases from the water phase. Once the desired polymer particle interaction is achieved the microparticulate settling aid is designed to facilitate the separation process by increasing the rate of solids settling. Representative microparticulate settling aids include bentonite clay, montmorillonite clay, particularly montmorillonite clay available from CETCO, Arlington Heights, Ill. under the tradename AltaFloc, microsand (80 mesh silica sand), colloidal silica, and the like.

"Colloidal silica" and "colloidal borosilicate" mean a stable aqueous dispersion of amorphous silica particles or amorphous borosilicate particles, respectively, usually having a particle size less than about 100 nm. Colloidal silica and colloidal borosilicate can be manufactured from materials such as sodium silicate or borosilicate and are commercially available, for example from Nalco Company, Naperville, Ill.

Preferred microparticulate settling aids include bentonite, montmorillonite, microsand, colloidal silica and colloidal borosilicate.

The microparticulate settling aid is preferably added to the thin stillage process stream prior to addition of the anionic polymer and any coagulant(s) at a dosage of about 10 to about 1,000 ppm.

Separation of the water from the coagulated and flocculated thin stillage solids may be accomplished using any means commonly used for solid-liquid separation.

In a preferred aspect, the separation is accomplished in a low-shear separation device such as a settling tank or dissolved air flotation (DAF) unit. A settling tank is more preferred.

A cut-away view of a preferred settling tank is shown in FIG. 2. The tank 1 can be, cylindrical, rectangular or square and contains a center chamber 2. A cylindrical settling tank with a conical bottom is preferred. The center chamber can be either cylindrical or rectangular with the preferred design being cylindrical.

The overall sizing of the settling tank depends upon the characteristics of the suspended solids, oil and grease concentrations in the influent process stream and the desired effluent rate and quality. In general there will be one combined influent stream into the unit and two discharge or effluent streams. The primary effluent stream is the treated process stream, which contains little to no suspended solids, fats, oils or greases. The second effluent stream is the underflow stream where solids, fats, oils and greases are concentrated and discharged for further processing.

The settling tank is preferably equipped with means for adjusting the depth of the center chamber for optimum settling and control of the solids and the liquid layer interface. There are a number of different methods available for controlling or adjusting the height of the center section of the clarifier. For example, the adjustment can be made manually by adjusting a supporting structure which suspends the center chamber. In more complicated designs the adjustment may be made automatically using settled solids monitoring devices like a bed depth detector or a solids/liquid interface monitoring system. The optimum setting of the center chamber height is dependent upon a number of factors present in the process such as influent flow, solids loading and mass balance, microparticulate settling aid dosage, polymer dosage, floc size, influent stream characteristics and oil and grease concentration, etc.

Thin stillage of a dry grind ethanol process stream treated with anionic polymer and any process aids according to this invention is transferred in to the center well of the solids settling unit by gravity flow in order to prevent shearing of the agglomerated solids. The solids then settle to the bottom of the unit. The settled material is removed from the bottom of the unit with a pump and transferred to another tank or process prior to addition to the distillers grains.

Typical thin stillage process influent flow may be as low as about 100 gpm or as high as about 2000 gpm. In applications where the flow is above about 200 gpm it is possible to treat the system and run the units in either parallel or series in order to optimize the performance of the unit and achieve the desired effluent quality.

The center chamber of the settling unit should have a retention time or volume sufficient to provide about 1 to about 15 minutes, preferably about 3 to about 7 minutes of retention. Total retention time in the settling unit is preferably from about 20 to about 100 minutes depending upon the composition and characteristics of the thin stillage stream being treated and the final effluent quality desired.

The total volume of the settling unit should be 15 to 100 times the flow into the unit. The height to diameter ratio of the solids liquids separation unit described in this preferred 5 embodiment should be in the range of 1.4:1 to as much as 3.5:1

Control of the level of the settled solids bed in the unit is critical as in some process streams it's advantageous to draw the influent stream through the bed or just across the surface of the settled solids while in other process streams it's advantageous to have a gap between the solids and the influent stream.

In a preferred aspect of this invention, the solids mass balance of the settling chamber is controlled by adjusting the influent flowrate.

In another preferred aspect, the solids mass balance of the settling chamber is controlled by adjusting the rate at which the solids are removed from the bottom of the settling chamber.

In another preferred aspect, the thin stillage process stream is treated with the anionic polymer and any coagulants and microparticulate settling aids and then mixed in a slow mix tank prior to introduction to the settling tank. The treatment can occur in line prior to the mix tank or in the mix tank itself. The preferred method is to treat the process stream in-line just before the mix tank. The process stream enters the mix tank through or near the bottom of the tank where it is subjected to gentle mixing designed to enhance agglomeration of the particles. The mixing can be accomplished by any means suitable for the desired gentle mixing. The sizing of this tank can vary depending upon the physical characteristics of the process stream being treated. The slow mix tank is preferably equipped with a variable speed mixer and a flat paddle prop in order to obtain the desired mixing energy and particle agglomeration.

The slow mix tank should have a holding or retention time for polymer particle 25 interaction of about 1 to about 15 minutes. The sizing of this chamber is dependent upon the composition and characteristics of the thin stillage stream being treated and the mixing energy available. Typical retention times of 3 to 5 minutes are preferred.

As noted above, the mixture of water and agglomerated solids is then transferred to the settling tank.

The method of this invention is preferably practiced as a continuous process where a stillage stream is continuously treated with the anionic polymer(s) and any process aids and transferred from the process to the mix tank. In this scenario a continuous effluent stream and concentrated solids stream are generated.

However, in certain instances it may be advantageous to operate the method as a batch treatment process where the material is treated with the processing aid and transferred to a settling tank. The tank would be allowed to stand undisturbed for some period of time after which the solids are drawn off and the clean water decanted. In this embodiment the settling unit could consist of either a single settling unit or a series of settling units.

The foregoing may be better understood by reference to the following examples, which are presented for purposes of illustration and are not intended to limit the scope of this invention.

EXAMPLE 1

A sample of thin stillage is obtained from the discharge side of a centrifuge in an ethanol plant. The physical properties of the stream are analyzed and the sample consists of 5.25% total solids with 3.50% being dissolved solids and 1.75% being suspended solids. Laboratory bench testing using a Phipps and Bird jar testing unit is conducted in order to simulate the mixing energy and physical conditions present in the treatment process. One sample is left untreated and the other 5 are treated with various combinations of treatment programs. Samples are allowed to settle and the supernate was collected from the top of the jar. The results are shown in Table 1.

TABLE 1

| Jar ID | Treatment | Suspended Solids |
|---|---|---|
| 1 | Untreated | 1.75% |
| 2 | 1 | 0.10% |
| 3 | 2 | 0.15% |
| 4 | 3 | 0.06% |
| 5 | 4 | 0.07% |
| 6 | 5 | 1.72% |

In Table 1, Treatment 1 consists of treating the sample with 150 ppm of sodium acrylate-acrylamide copolymer having an anionic charge of about 40 mole percent and a reduced specific viscosity range of 20-40 dl/g. Treatment 2 consists of treating the sample with 20 ppm of poly(diallyldimethylammonium chloride having an IV of 0.05 to 0.25 followed by 150 ppm of sodium acrylate-acrylamide copolymer having an anionic charge of about 40 mole percent and a reduced specific viscosity range of 20-40 dl/g. Treatment 3 consists of treating the sample with 20 ppm of polyDADMAC having a molecular weight of 1.6 MM followed by 150 ppm of sodium acrylate-acrylamide copolymer having an anionic charge of about 40 mole percent and a reduced specific viscosity range of 20-40 dl/g. Treatment 4 consists of treating the sample with 200 ppm of bentonite clay followed by 200 ppm of sodium acrylate-acrylamide copolymer having an anionic charge of about 40 mole percent and a reduced specific viscosity range of 20-40 dl/g. Treatment 5 consists of treating the sample with 150 ppm of acrylamide-DMAEA-MCQ copolymer having a cationic charge of about 30 mole percent and a reduced specific viscosity 5 range of 20-30 dl/g.

The data in Table 1 shows that treatment combinations 2-6 as described above are effective in coagulating and agglomerating the particulate matter in order to facilitate solid-liquid and liquid-liquid separation processes. The data shows that with the appropriate treatment program and settling equipment it is possible to capture and remove 92-98 percent of the suspended solids from the thin stillage process stream.

EXAMPLE 2

A pilot process is set up as shown in FIG. 2. The same sample of thin stillage as used in Example 1 is used in this experiment. The sample consists of 5.25% total solids with 3.50% being dissolved solids and 1.75% being suspended solids. The sample also contains 3600 ppm of fats oils and grease as determined by FOG analysis. The treatment program comprises treating the sample with 150 ppm of a sodium acrylate-acrylamide copolymer having an anionic charge of about 40 mole percent and a reduced specific viscosity range of 20-40 dl/g.

The pilot process is run in automatic mode for a total of 5 hours. A sample of the effluent from the pilot unit is collected each hour and the sample is analyzed for suspended solids, fats oils and grease. The results are shown in Table 2.

TABLE 2

| Time | Total Solids | Dissolved Solids | Suspended Solids | Capture Efficiency | FOG |
|---|---|---|---|---|---|
| 0 | 5.25% | 3.50% | 1.75% | 0% | 3600 ppm |
| 2 hr | 3.61% | 3.50% | 0.11% | 93.7% | 220 ppm |
| 3 hr | 3.71% | 3.50% | 0.20% | 88.5% | 80 ppm |
| 4 hr | 3.53% | 3.50% | 0.03% | 98.2% | 420 ppm |
| 5 hr | 3.66% | 3.50% | 0.16% | 90.8% | 290 ppm |

Samples of the settling chamber underflow are also collected at various times during the testing and analyzed for solids content. Samples containing between 9.5 and 17.8% solids are collected during the testing.

The test results show an 88.5% to 98.2% increase in capture removal efficiency of solids, resulting in an 88 to 98% decrease in solids in the effluent. The fats oil and grease in the effluent from the pilot unit are also reduced by 88% to 98%. Samples of the settling chamber underflow are collected at various times during the testing and analyzed for percent solids content. The results show a 180% to 339% increase in the concentration of solids as compared to the thin stillage discharge of the centrifuge.

EXAMPLE 3

A pilot process is set up as shown in FIG. 2. A sample of thin stillage from another ethanol plant is used in this experiment. The sample consists of 5.49% total solids with 3.74% being dissolved solids and 1.75% being suspended solids. The sample also contains 3100 ppm of fats, oil and grease as determined by FOG analysis.

The pilot process is run in automatic mode for a total of 3 hours. The treatment program consists of treating the sample with 150 ppm of a sodium acrylate-acrylamide copolymer having an anionic charge of about 40 mole percent and a reduced specific viscosity range of 20-40 dl/g.

Samples of the effluent from the pilot unit are collected periodically and analyzed for suspended solids and the fats oils and grease. The results are shown in Table 3.

TABLE 3

| Time | Total Solids | Dissolved Solids | Suspended Solids | Capture Efficiency | FOG |
|---|---|---|---|---|---|
| 0 | 5.49% | 3.77% | 1.75% | 0% | 3100 ppm |
| 2 hr | 3.89% | 3.77% | 0.12% | 96.7% | 140 ppm |

The data in Table 3 show a 96.7% increase in capture removal efficiency of solids, resulting in an 97% decrease in solids in the effluent. The fats oil and grease in the effluent from the pilot unit are also reduced by 96%.

Changes can be made in the composition, operation, and arrangement of the method of the invention described herein without departing from the concept and scope of the invention as defined in the claims.

The invention claimed is:

1. A method of removing suspended solids, fats, oils and grease from the thin stillage liquid stream from a dewatering device for stillage of a dry grind ethanol process stream comprising:
   (i) Adding to the thin stillage liquid stream from a dewatering device for stillage of a dry grind ethanol process stream an effective flocculating amount of one or more anionic polymers, the anionic polymers comprising one or more anionic monomers selected from acrylic acid sodium salt, 2-acrylamido-2-methyl-1-propanesulfonic acid sodium salt and methacrylic acid sodium salt and optionally one or more acrylamide monomers to form a mixture of water and flocculated solids, wherein the anionic polymer has a reduced specific viscosity of about 10 to about 60 dl/g; and
   (ii) separating the water from the flocculated solids using a solids/liquids separation device.

2. The method of claim 1 wherein the anionic polymer is selected from the group consisting of dry polymers, emulsion polymers and dispersion polymers.

3. The method of claim 1 wherein the anionic polymer has an anionic charge of about 10 to about 100 mole percent.

4. The method of claim 1 wherein the anionic polymer has an anionic charge of about 30 to about 70 mole percent.

5. The method of claim 1 wherein the acrylamide monomer is acrylamide.

6. The method in claim 1 where the anionic polymer further comprises about 0.005 to about 10 ppm of one or more cross linking agents.

7. The method of claim 6 wherein the cross linking agents are selected from polyethyleneglycol(400)-dimethacrylate or trimethylolpropane ethoxylate (14EO/3OH) tri(meth)acrylate.

8. The method of claim 1 wherein the anionic polymer is selected from the group consisting of acrylamide-acrylic acid sodium salt copolymer and acrylamide-2-acrylamido-2-methyl-1-propanesulfonic acid sodium salt copolymer.

9. The method of claim 1 wherein the anionic polymer is acrylamide-sodium acrylate-sodium methacrylate terpolymer.

10. The method of claim 9 wherein the anionic polymer has an anionic charge of about 1 to about 50 mole percent.

11. The method of claim 1 wherein the anionic polymer is selected from the group consisting of dry polymers and emulsion polymers.

12. The method of claim 11 wherein the anionic polymer has a reduced specific viscosity of about 15 to about 40 dl/g.

13. The method of claim 1 wherein about 50 to about 1000 ppm of anionic polymer is added to the thin stillage of the dry grind ethanol process solids.

14. The method of claim 1 further comprising adding an effective coagulating amount of one or more cationic coagulants to the thin stillage of the dry grind ethanol process stream.

15. The method of claim 14 wherein the cationic coagulant is selected from poly(diallyldimethylammonium chloride) and epichlorohydrin-dimethylamine.

16. The method of claim 15 wherein the coagulant is added before the flocculating anionic polymer.

17. The method of claim 1 further comprising adding one or more microparticulate settling aids to the thin stillage of the dry grind ethanol process stream.

18. The method of claim 17 wherein the microparticulate settling aid is selected from bentonite, montmorillonite, colloidal silica, colloidal borosilicate and microsand.

19. The method of claim 1 wherein the thin stillage of the dry grind ethanol process stream solids are corn stillage solids.

20. The method of claim 1 wherein the solids/liquids separation device is a low shear device.

21. The method of claim 20 wherein the solids/liquids separation device is a settling tank comprising a center chamber.

22. The method of claim 21 wherein the settling tank further comprises means for adjusting the depth of a center well.

23. The method of claim 22 wherein the solids mass balance of a settling chamber is controlled by adjusting a influent flow rate.

24. The method of claim 22 wherein the solids mass balance of a settling chamber is controlled by adjusting the rate at which the solids are removed from the bottom of the settling chamber.

* * * * *